W. H. SANDFORD.
DEVICE FOR SECURING HAWSERS, ROPES, AND THE LIKE.
APPLICATION FILED JULY 23, 1918.
1,355,004.
Patented Oct. 5, 1920.
2 SHEETS—SHEET 1.
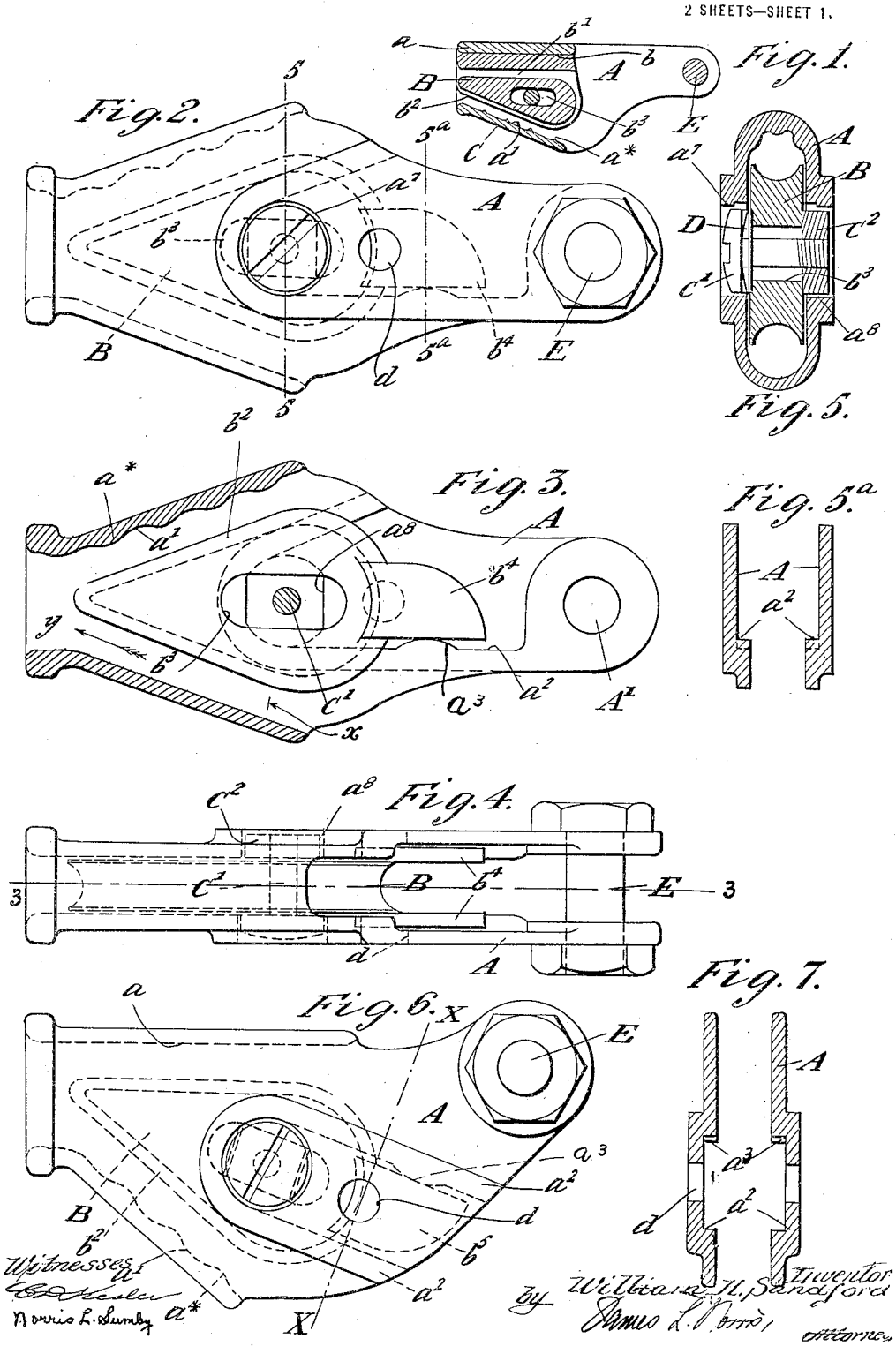

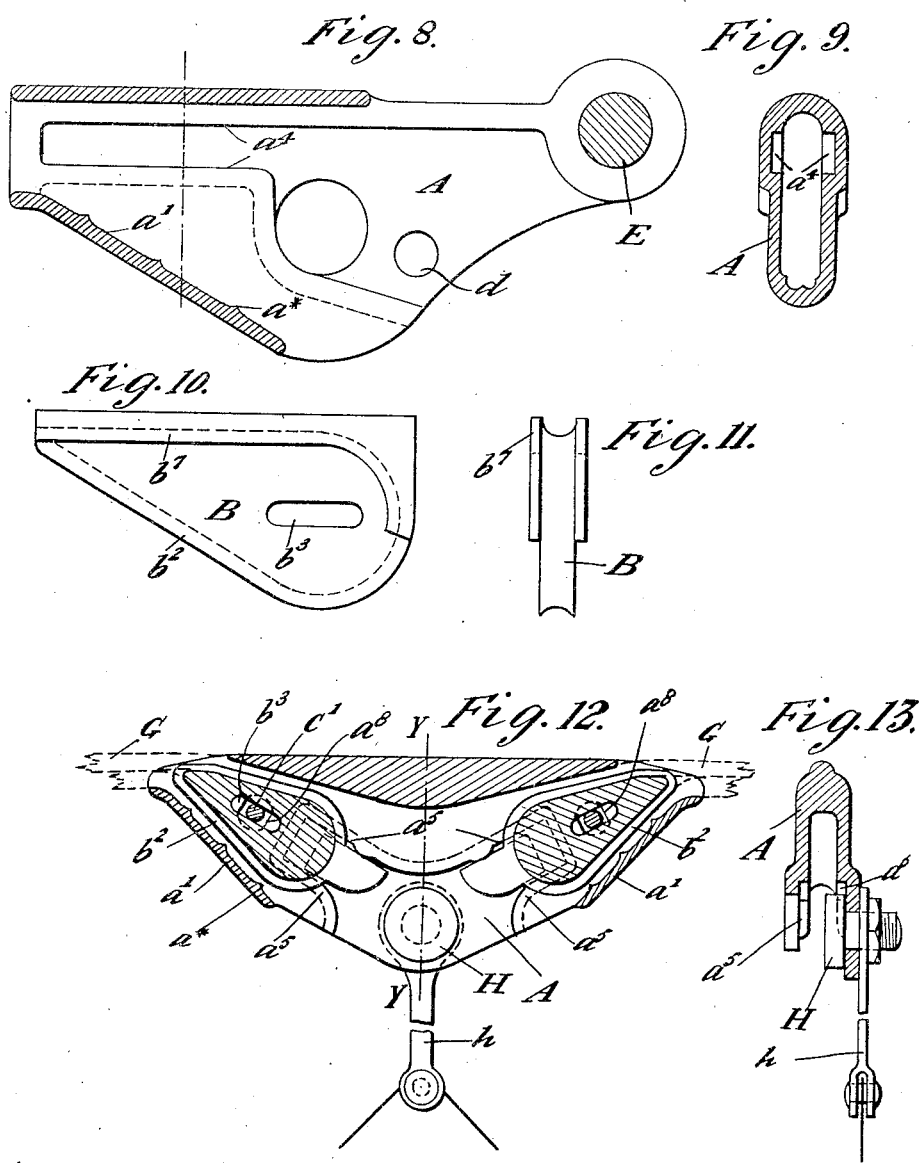

UNITED STATES PATENT OFFICE.

WILLIAM HERBERT SANDFORD OF ARMAGH, IRELAND.

DEVICE FOR SECURING HAWSERS, ROPES, AND THE LIKE.

1,355,004.

Specification of Letters Patent.

Patented Oct. 5, 1920.

Application filed July 23, 1918. Serial No. 246,373.

*To all whom it may concern:*

Be it known that I, WILLIAM HERBERT SANDFORD, a subject of the King of Great Britain, residing in Armagh, Ireland, have invented certain new and useful Improvements in Devices for Securing Hawsers, Ropes, and the like, of which the following is a specification.

My present invention relates to devices for coupling, securing or gripping hawsers, ropes and the like, the devices being of the type consisting each of a tapered sheath of suitable material and a sliding wedge piece mounted to slide within the sheath, the wedge and sheath being so arranged that when a pull is exerted on a hawser or rope, rove about the wedge, the wedge is moved within the sheath in a manner to cause the hawser or rope to be gripped or jammed in a passage or passages formed by and between the peripheral side or edge of the wedge and the sheath, means being provided for guiding the wedge in its movements and for locking it in the gripping position. My invention consists in improvements the object being to construct a device of the above kind so that a rope or the like may be gripped without impairing its strength and bringing an unfair stress upon any part of it that is subject to a direct strain or pull.

The above object may be attained by constructing the grip device so that the hawser or rope is gripped between only one peripheral side of the wedge piece and the sheath, the grip being taken upon the lazy end of the rope, that is to say—upon that portion of it upon which the strain or pull applied to the rope does not come directly. This can be brought about by making the smallest possible section of the passage for the lazy end of the rope less than the corresponding section of the passage wherein the adjacent portion of the rope is arranged. In order to minimize or prevent any tendency of the wedge piece to turn in the sheath by reason of a pull on the rope, thereby nipping the rope and so bringing an unfair stress on it, the grip device may be provided with means for guiding the wedge in its movements relatively to the sheath.

I will describe my invention with reference to the accompanying drawing, in which Figure 1 is a sectional elevation of a grip device constructed according to this invention and constituting a combined shackle and attachment for a rope, the device being formed so that the lazy end only of a rope is gripped between the wedge and sheath. Fig. 2 is a side elevation, Fig. 3 is a section on line 3—3 of Fig. 4, Fig. 4 is a plan, Fig. 5 is a section on line 5—5 of Fig. 2 and Fig. 5ª is a section on line 5ª—5ª of Fig. 2, of a grip device in which the wedge is provided with lateral projections that serve as guides and are adapted to slide in guideways on the inner faces of the sheath, thereby guiding the wedge in its movements and preventing its turning. Figs. 6 and 7 are respectively a sectional elevation and a cross section, on line X—X of Fig. 6, of a grip device in which are embodied the novel features shown in the preceding figures and in which the pull on the rope would be in a straight line. Figs. 8 and 9 being respectively a sectional elevation and cross section of a sheath and Figs. 10 and 11 an elevation and end view of a wedge of a modified form of the improved grip device; Fig. 12 is a form of the improved grip device adapted for use particularly in aerial rope-ways and comprising two wedge pieces in one sheath; and Fig. 13 is a cross section on line Y—Y in Fig. 12.

In the several figures corresponding parts are denoted by the same letters.

In the drawings, A denotes a portion of the sheath of a grip device, B the wedge piece, C a machine screw and C' a bolt for connecting and locking the wedge piece to the sheath, D a spring washer that may, if desired, be interposed between the head of the member C or C' and the wedge piece B, and E is a bolt passing through an eye A' provided in the sheath and constitutes a shackle for attachment of the grip device to another object or appliance.

In the form of the grip device shown in Fig. 1, the peripheral side or edge face *b* of the wedge piece B is arranged to bear snugly and slide upon the opposing or inner face *a* of the sheath A. The wedge during its movements is guided by the edge face *b* bearing against the inner face *a* of the sheath. A longitudinal hole *b'* is provided in the wedge piece through which the hawser or rope may be rove. The hawser or rope so rove is bent over the top of the wedge piece, which is shaped to receive it snugly, and passed down between the other side or edge $b^2$ of the wedge piece and the inner face $a'$ of the sheath, which face should be roughened, ribbed or corrugated, as shown for example at $a^*$, so that the free or lazy end of the rope is thereby gripped between the wedge and sheath. The corrugations would preferably be arranged to suit the lay of the rope to be gripped.

The wedge piece B may be locked in position by means of a screw stud C which may be arranged to pass through an aperture $a^7$ in one side of the sheath, through a slot $b^3$ in the wedge piece and screw into a tapped hole in the opposite side of the sheath, thus binding the wedge piece against the latter side of the sheath, the head of the bolt being sunk into the aperture in the side of the sheath so that the under face of the head bears on the wedge piece. Alternatively, a bolt and nut may be used and secured in the manner described below with reference to Fig. 5.

The terminal or lug portions $a^8$ of the sheath instead of being provided with holes for the reception of the shackle E may be furnished with one of the various attaching appliances commonly used, such as a hook, a bottle-screw, swivel or the like as in Fig. 13. A hole $d$ may be provided in the wedge so that a punch or spike may be passed through this hole and the slot $b^3$ in the wedge to hold the latter in a retracted position while the rope is being roved.

In the form of the grip device shown in Figs. 2–5$^a$, a rearwardly extending projection $b^4$ is cast upon each of the two lateral sides or faces of the wedge piece B. These projections or extensions, which serve to guide the wedge in its movements, are adapted to slide along open channels or guideways $a^2$ formed on the inner faces of the two lateral sides of the sheath A. To reduce friction the guideways may be formed each with a rounded projection, such as $a^3$. The wedge piece may be locked in position in the way mentioned above, or a bolt $C^1$ and nut $C^2$ may be used for the purpose, the point of the bolt $C^1$ being screwed into a nut $C^2$ located in an aperture $a^8$ in the adjacent side of the sheath. By reason of the coöperation of the guides or projections $b^4$ with the guideways $a^2$ the wedge piece is prevented from turning about the bolt $C'$, when a pull in the direction of the arrow $y$ comes on the rope, and thereby from pinching the rope, for instance in the neighborhood of the point $x$. The guideways $a^2$ may be disposed in a longitudinal direction with regard to the sheath, as indicated in Figs. 2 and 3, or, as indicated in Fig. 6, at an angle to that direction as found most efficient.

To allow of relative longitudinal movement between the wedge piece and sheath in the above described arrangements, either the slot $b^3$ or the slot $a^8$ would be of elongated shape.

The construction shown in Figs. 6 and 7 is similar to that in Figs. 2–5, but the arrangement is such that the pull on the rope would be in a straight line as in the arrangement shown in Fig. 1, and the projections or guides $b^5$ on either side of the wedge are adapted to slide between pairs of guideways $a^2$.

In the construction shown in Figs. 8–11, the sheath and wedge piece when assembled would be arranged as described above with reference to Fig. 1, but the wedge piece in this case is provided on either side with projections or guides $b^7$ which are disposed along its upper edge and are adapted to slide in grooves or guideways $a^4$ formed on the inside faces of the sheath. The projections are formed so that they totally or partially take the stress off one side of the rope, which is passed between them for that purpose, by coming into contact with the sheath in a fixed position with regard to one side thereof.

The grip device shown in Figs. 12 and 13 is intended for gripping the ends of two ropes G which may constitute an aerial ropeway. As shown in Fig. 12 the sheath contains two wedges and may be termed a double sheath. The upper portion of the sheath may be reduced in width so that it may serve as a connecting rail between two ropeway portions G, upon which the ropeway carriers may travel. The guideways $a^5$ may be directed as indicated, that is at an angle to the length of the ropes or ropeway, and not parallel therewith as shown in Figs. 2 and 5.

In this case locking bolts for the sheath may be provided but would not generally be used, as there is no need for them.

A bolt H which may pass through one side only of the sheath, the other side of the sheath being cut away to clear it, is secured in position by means of a nut $h$ and prevents the wedge-pieces from falling out. It carries a bar I which at its lower end may be provided with guy ropes, and which serves to prevent the device turning when a strain is put on the ropes.

Having thus described the nature of my invention and the best means I know for carrying the same into practical effect, I claim:—

1. A device, of the kind referred to, for coupling, securing or gripping hawsers, and rope-like members, comprising in combination an internally tapered sheath, a wedge piece slidably mounted within the sheath and forming therewith a passage for the reception of the lazy end of a rope-like member rove about the wedge piece, and means for preventing rotation of the wedge relatively to the sheath about an axis transverse to the sheath and wedge, the said means comprising a guide surface on an internal face of the sheath and a part on the wedge piece adapted to bear and slide on said surface.

2. A device, of the kind referred to, for coupling, securing or gripping hawsers and rope-like members, comprising in combination an internally tapered sheath, a wedge piece slidably mounted within the sheath and forming therewith a passage for the reception of the lazy end of a rope-like member rove about the wedge piece, means for preventing rotation of the wedge relatively to the sheath about an axis transverse to the sheath and wedge, said sheath being formed with open channels on its inner side faces and said means consisting of projections carried by each of the two side faces of the wedge and adapted to slide in said channels.

3. A device of the kind referred to, for coupling, securing or gripping hawsers and rope-like members, comprising in combination an internally tapered sheath, a pair of wedge pieces slidably mounted within the sheath and forming therewith passages for the reception of the lazy ends of a pair of rope-like members rove respectively about the wedge pieces, and means for preventing rotation of the wedge pieces relatively to the sheath about axes transverse to the sheath and the wedge pieces, the said means comprising open channels formed in the sheath and projections on the wedges slidable in the channels.

4. A device of the kind referred to, for coupling, securing or gripping hawsers and rope-like members, comprising in combination an internally tapered sheath, a pair of wedge pieces slidably mounted within the sheath and forming therewith passages for the reception of the lazy ends of a pair of rope-like members rove respectively about the wedge pieces, means for preventing rotation of the wedge pieces relatively to the sheath about axes transverse to the sheath and the wedge pieces, said sheath being formed with open channels on its inner faces, said channels forming oppositely disposed pairs, and said means consisting of parts projecting from the two side faces of each wedge piece and located respectively in the pairs of channels.

5. A device of the kind referred to, for coupling, securing or gripping hawsers and rope-like members, comprising in combination an internally tapered sheath, a pair of wedge pieces slidably mounted within the sheath and forming therewith passages for the reception of the lazy ends of a pair of rope-like members rove respectively about the wedge pieces, means for preventing rotation of the wedge pieces relatively to the sheath about axes transverse to the sheath and the wedge pieces, said sheath being formed with open channels on its inner faces, said channels forming oppositely disposed pairs, and said means consisting of rearwardly directed parts projecting from the two side faces of each wedge piece and located respectively in the pairs of channels.

WILLIAM HERBERT SANDFORD.